US011903519B2

(12) United States Patent
Accursi et al.

(10) Patent No.: US 11,903,519 B2
(45) Date of Patent: Feb. 20, 2024

(54) CAPSULE, METHOD FOR RECOGNISING THE CAPSULE AND METHOD FOR MAKING A BEVERAGE WITH THE CAPSULE

(71) Applicant: CAFFITALY SYSTEM S.P.A., Gaggio Montano (IT)

(72) Inventors: Giovanni Accursi, Alto Reno Terme (IT); Maurizio Diamanti, Castel di Casio (IT)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 1064 days.

(21) Appl. No.: 16/628,747

(22) PCT Filed: Jun. 22, 2018

(86) PCT No.: PCT/IB2018/054628
§ 371 (c)(1),
(2) Date: Jan. 6, 2020

(87) PCT Pub. No.: WO2019/021077
PCT Pub. Date: Jan. 31, 2019

(65) Prior Publication Data
US 2020/0281396 A1 Sep. 10, 2020

(30) Foreign Application Priority Data
Jul. 24, 2017 (IT) .......................... 102017000084356

(51) Int. Cl.
A47J 31/44 (2006.01)
B65D 85/804 (2006.01)

(52) U.S. Cl.
CPC ...... A47J 31/4492 (2013.01); B65D 85/8058 (2020.05); B65D 85/8043 (2013.01); B65D 2203/02 (2013.01)

(58) Field of Classification Search
CPC ............. A47J 31/4492; B65D 85/8058; B65D 85/8043
See application file for complete search history.

(56) References Cited

U.S. PATENT DOCUMENTS

2016/0130076 A1  5/2016  Jarisch
2017/0334635 A1  11/2017  Aschwanden

FOREIGN PATENT DOCUMENTS

EP  3031750 A1      6/2016
EP  3272674 A1 *   1/2018  ........... B65B 61/025

(Continued)

Primary Examiner — Reginald Alexander
(74) Attorney, Agent, or Firm — Pearne & Gordon LLP; J. Gregory Chrisman

(57) ABSTRACT

A method for recognising a capsule in an apparatus that uses capsules for making beverages, comprising the steps of:
acquiring an electronic image which shows a part of the outer surface of the capsule lid and in which an asymmetrical graphical element and a graphical code are present;
identifying in the image the asymmetrical graphical element or parts of it, identifying its position in the image and saving it as a reference position; and
starting from the reference position and using a predetermined position of the graphical code relative to the asymmetrical element, identifying in the image a position in which the graphical code is located and a graphical code reading orientation;
reading the graphical code taking into account the position and orientation previously identified in the image, obtaining a code in electronic format; and
considering the capsule recognised when the code in electronic format has been obtained.

14 Claims, 3 Drawing Sheets

(56) References Cited

FOREIGN PATENT DOCUMENTS

| EP | 3017734 B1 | * | 12/2018 | ........... A47J 31/4492 |
|----|------------|---|---------|--------------------------|
| GB | 2499201 A  | * | 8/2013  | .............. A47J 31/00 |
| WO | 2014206799 A1 |   | 12/2014 | |
| WO | WO-2016176779 A1 | * | 11/2016 | ........... A47J 31/4492 |

* cited by examiner

CAPSULE, METHOD FOR RECOGNISING THE CAPSULE AND METHOD FOR MAKING A BEVERAGE WITH THE CAPSULE

FIELD OF THE INVENTION

This invention relates to a method for recognising a capsule, in an apparatus that uses capsules for making beverages as well as use of that method in an apparatus for making a beverage.

BACKGROUND OF THE INVENTION

As is known, there are many different types of beverages which can be made with an apparatus that uses capsules, although so far the most widespread beverage is coffee (in all of its forms, espresso, American, filter, etc. . . . ). The common denominator of all of the apparatuses is that the beverage is made by passing water that is more or less hot and more or less pressurised through the powdered food substance.

In particular, this invention is for all systems for making beverages which use capsules, in which the capsule has a substantially symmetrical shape about its own central axis and can be inserted in the apparatus with any orientation. Whilst in the most simple apparatuses the supplying parameters are either always the same or can be changed manually by the user, in recent years we have increasingly also been moving towards the spread of automatic or semi-automatic machines capable of independently adapting the supplying parameters depending on the type of capsule that is inserted in the apparatus. For that purpose apparatuses are equipped with a detecting device able to read information associated with the capsule.

Amongst said apparatuses, those which are the most widespread are the ones in which the recognition device is an optical recognition device capable of acquiring an electronic image of a portion of the capsule and of recognising a graphical code that is visible in that image.

Over the years various types of graphical codes have also been proposed, such as alphanumeric codes or colour codes, but those which have been the most successful are bar codes or QR codes, thanks to the fact that they are graphical codes already widely used in other sectors and for which computerised recognition techniques are highly developed.

However, at present, no valid solution has been proposed regarding the use of such graphical codes on capsules without a predetermined orientation of insertion in the apparatus. Such capsules, in fact, may show up in front of the image acquisition device with any orientation about their own central axis, meaning that it is not possible to known in advance the position in which the graphical code is located and its orientation.

In an attempt to get around that problem various types of solutions have been proposed up to now.

According to a first solution the graphical code is positioned at the central zone of the capsule in such a way that only its angular position needs to be identified; for that application the QR code is advantageous since many algorithms have already been developed for it in order to identify the angle of rotation of the image.

According to a second solution, the graphical code is constituted of a set of alternating (white and black) concentric rings which can be observed along any line that is radial relative to the central axis; in fact, whatever the radial reading line, they appear as a traditional bar code.

Finally according to a further solution, the bar code is extended (and if necessary repeated multiple times) along a ring coaxial to the axis of rotation. All of these embodiments, although technically functional, are however not well liked by capsule manufacturers since, at least in many cases, there is the need or at least the desire to use on the disk-shaped lid of the capsule logos and brands which allow the user to identify the manufacturer, rather than the type of beverage contained in the capsule.

Therefore in the capsule manufacturer sector the need is felt to minimise the impact of the capsule identification graphical code on the aesthetics of the capsule itself. At the same time that must not negatively impact the costs of the apparatus; in fact it must be remembered that apparatus manufacturers are also equally aware of, the need for the whole capsule recognition system to have an extremely low cost during production (around ten euros—which excludes the use of known recognition systems already used in other sectors).

BRIEF SUMMARY OF THE INVENTION

In this context the technical purpose which forms the basis of this invention is to provide a method for recognising a capsule which overcomes the above-mentioned disadvantages.

In particular the technical purpose of this invention is to provide a method for recognising a capsule which is able to also recognise capsules marked with a graphical code that is located in an off-centre position (and relatively small) irrespective of the angular position adopted by the capsule lid.

The technical purpose specified and the aims indicated are substantially achieved by a method for recognising a capsule as described in the appended claims.

As described in detail below, the context of this invention also covers a method for making beverages which uses the recognition method, as well as a method for making a plurality of capsules recognisable and a capsule made in such a way that it is recognisable using the above-mentioned recognition method.

BRIEF DESCRIPTION OF THE DRAWINGS

Further features and the advantages of this invention are more apparent in the detailed description with reference to the accompanying drawings which illustrate several preferred, non-limiting embodiments of a method for recognising a capsule, in which.

DETAILED DESCRIPTION OF THE INVENTION

Figure 1:
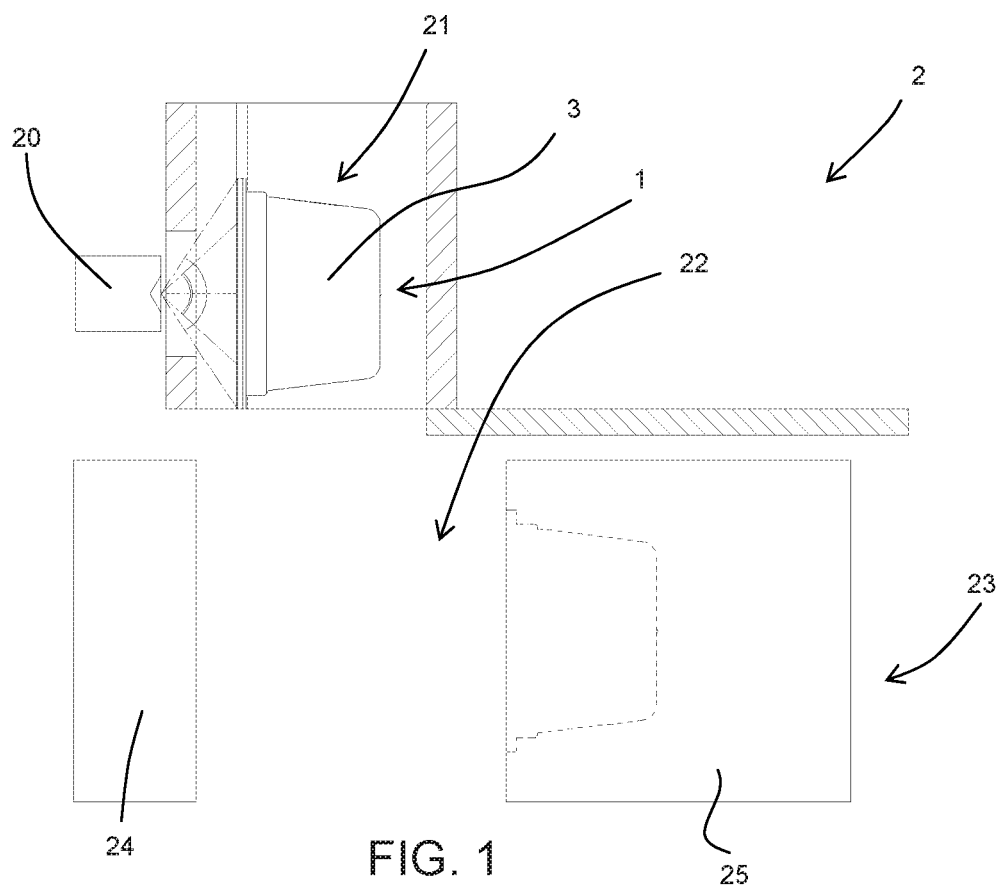
FIG. 1 is a schematic side view of the main structure of an apparatus that uses capsules for making beverages equipped with an optical recognition device for the capsule.
Figure 2:
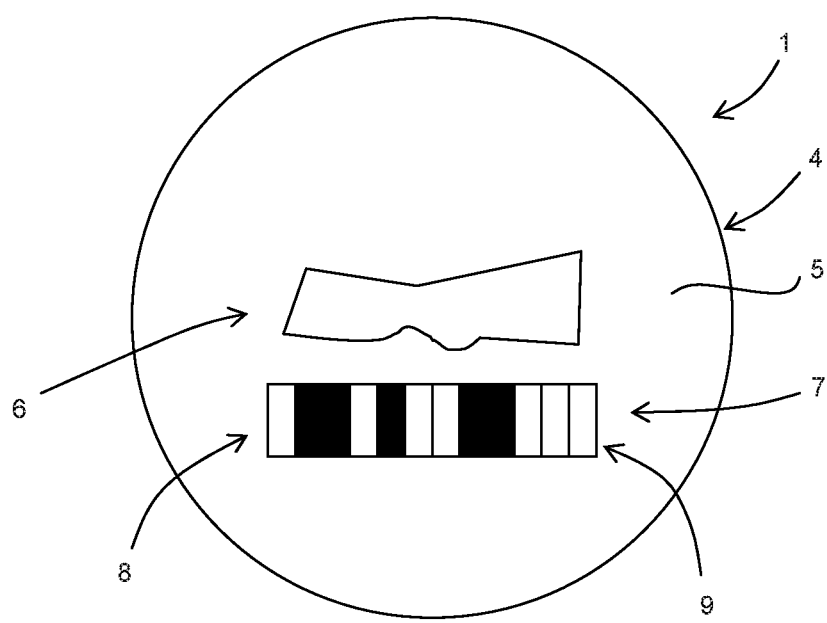
FIG. 2 is a top view of a capsule for which the method according to this invention can be applied.

As already indicated, this invention relates first to a method for recognising a capsule 1 in an apparatus 2 that uses capsules for making beverages.

That method may be applied in the case of a capsule 1 which has a cup-shaped body 3 that is closed at the top by a disk-shaped lid 4 and that contains a food substance (not illustrated in the accompanying figures, just as any internal details of the capsule are not illustrated, such as filters, water distributors, etc.), and if the capsule 1 may adopt inside the apparatus 2 any rotational position relative to its own central axis which is substantially perpendicular to the disk-shaped lid 4 and passes through a central point 10 of the disk-shaped lid 4.

Furthermore, the method may be applied where on an outer surface 5 of the disk-shaped lid 4 there are an asymmetrical graphical element 6 superposed on the central point 10 of the self-same outer surface 5, and a graphical code 7 that is located in an eccentric position relative to the central point 10. The graphical code 7 and the asymmetrical graphical element 6 are advantageously two separate elements.

For application of the method it is also necessary that the position of the asymmetrical graphical element 6 and the graphical code 7 relative to each other is a known predetermined position, that is to say that in all of the capsules to be recognised which bear a predetermined asymmetrical graphical element 6, the graphical code 7 must always be positioned in the same position relative to the asymmetrical graphical element 6. The method can also be applied for graphical codes 7 with the same structure, but different informative content.

In the preferred embodiment of this invention the graphical code 7 is a bar code, and it has its own reading orientation (in the known way the code has a smaller start side 8 and a smaller stop side 9). Advantageously, moreover, all possible bar codes applicable on a capsule 1 will have the same overall size (in terms of height and length) and the same minimum width of the bars (each bar will have a width that is a whole multiple of the minimum width). At the same time different bar codes for separate capsules 1, may have sequences of light and dark bars which are completely different to one another (each different code corresponding to a capsule 1 of a different type in terms of the type of beverage and/or supplying method). It should be remembered that in the known way, it is possible to obtain a bar code with constant length, even with different encoded information, by using for each value encoded in a field, a corresponding parity field and ensuring that the sum of the lengths of each field and of the relative parity field is always constant.

Depending on requirements, the graphical code 7, irrespective of its type, may contain a capsule 1 identifier, or information about the supplying parameters to be used for making the beverage. In both cases that code should in any case be considered a code which allows recognition of the capsule 1 in the sense understood according to this invention. In fact, once the information contained in the graphical code 7 is known, whilst in the latter case the apparatus 2 may proceed directly to making the beverage using the information that the capsule 1 itself provides, in the former case it must refer to a digital database in which, for each type of capsule 1, the relative supplying parameters are saved.

As regards the steps of the recognition method, first it comprises an acquisition step during which, by means of a detecting device 20 belonging to the apparatus 2, an image in electronic format is acquired which shows the appearance of at least one part of the outer surface 5 of the disk-shaped lid 4 (again understood to be the appearance of the surface in the visible spectrum). Advantageously that is done while the capsule 1 is at an image capture zone 21 which, as in the embodiment schematically illustrated in FIG. 1, may be located upstream of the extraction chamber 22 along a path for capsule 1 insertion in the apparatus 2. It should be noticed that FIG. 1 relates to an apparatus 2 with a horizontal unit (that is to say with an extraction unit 23 comprising two parts 24, 25 at least one of which is movable along a horizontal axis for opening and closing the extraction chamber 22), but the image capture zone 21 may be outside the extraction chamber 22 even in other embodiments. However, in other embodiments, the image capture zone 21 may even be at the extraction chamber 22 (open or closed).

Figure 3:
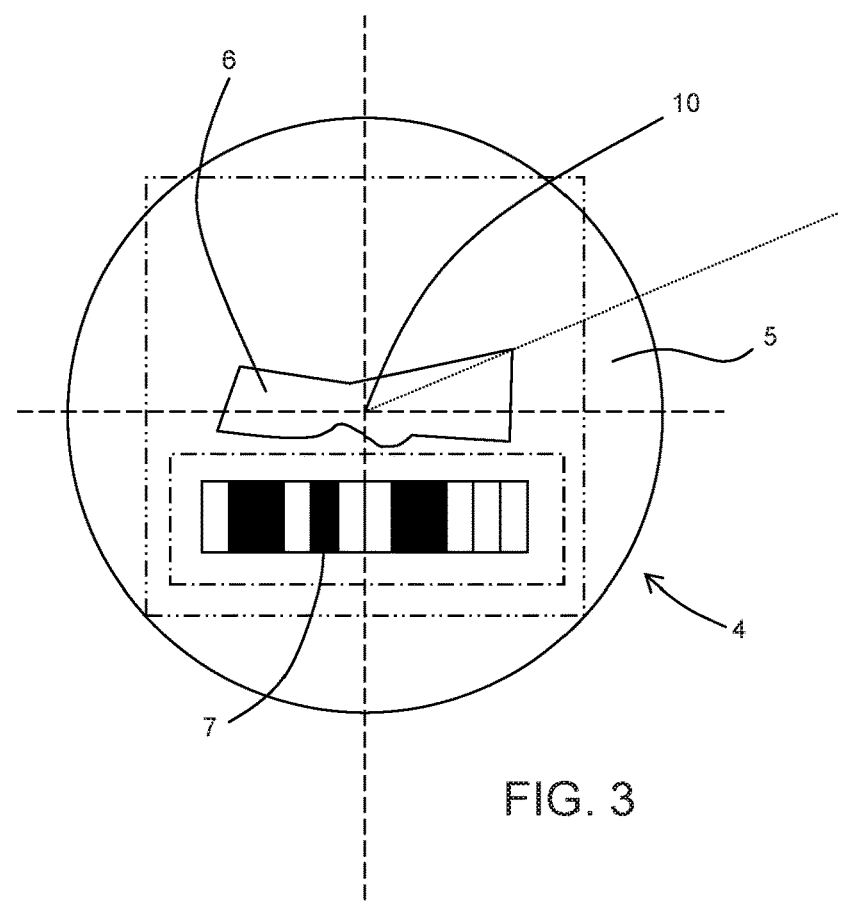
FIG. 3 is a top view of the capsule of FIG. 2 with dashed lines highlighting several reference areas and lines.
Figure 4:
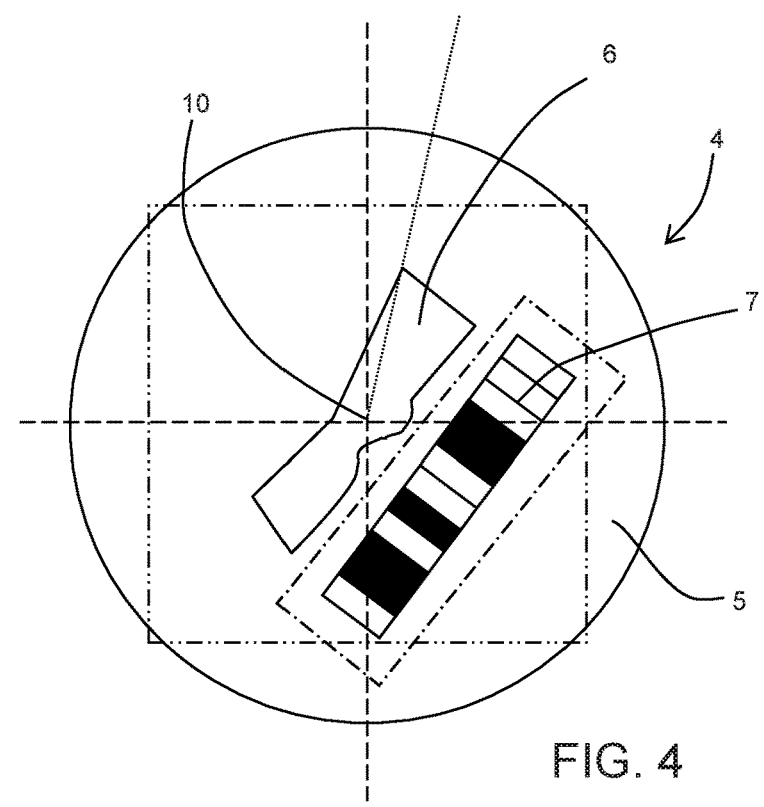
FIG. 4 is a top view with dashed lines of the same elements as in FIG. 3 but with the capsule rotated by an arbitrary angle.

It should also be noticed that the electronic image which is acquired must be set beforehand to be large enough to always be able to contain both the asymmetrical graphical element 6 and the graphical code 7, irrespective of the rotational position of the capsule 1 about its own central axis (in other words the image must be sized so that it at least circumscribes a circle which is centred on the central point 10 of the outer surface 5 of the lid and which has a radius equal to the maximum distance of a point of the asymmetrical graphical element 6 or of the graphical code 7, relative to the central point 10). In FIGS. 3 and 4 the size of the image is shown by the square with lines made up of a dash and two dots.

The method also comprises using the electronic processing unit of the apparatus 2 to identify in the electronic image the whole asymmetrical graphical element 6, or one or more parts of it, as well as to save the position in the image of the asymmetrical graphical element 6 or of its one or more parts, as a reference position for the subsequent steps.

Since the asymmetrical graphical element 6 can be identified using any known image recognition technique, that aspect is not described in further detail herein.

Again using the electronic processing unit of the apparatus 2, the method then comprises identifying in the electronic image the position of the graphical code 7 and determining which direction corresponds to the reading orientation of the graphical code 7 (for example it may all be expressed relative to a reference system considered stationary relative to the optical detecting device). That is done starting from the reference position previously identified and using the known predetermined position (which may for example be expressed in vectorial terms relative to a reference system fixed to the asymmetric graphical element 6).

Figure 5:
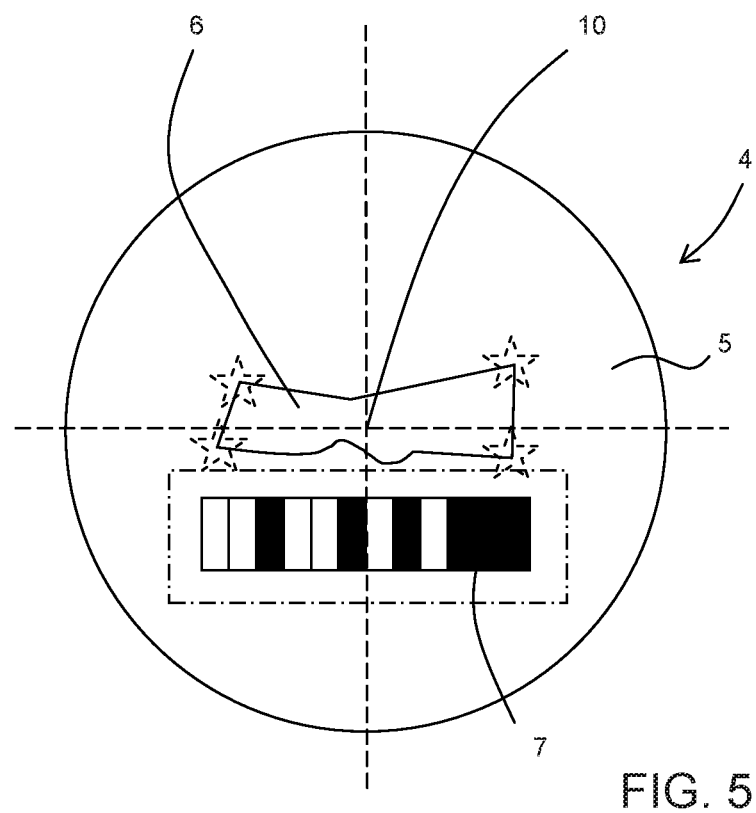
FIG. 5 is a top view of a capsule similar to that of FIG. 2 with dashed lines highlighting several different reference zones.
Figure 6:
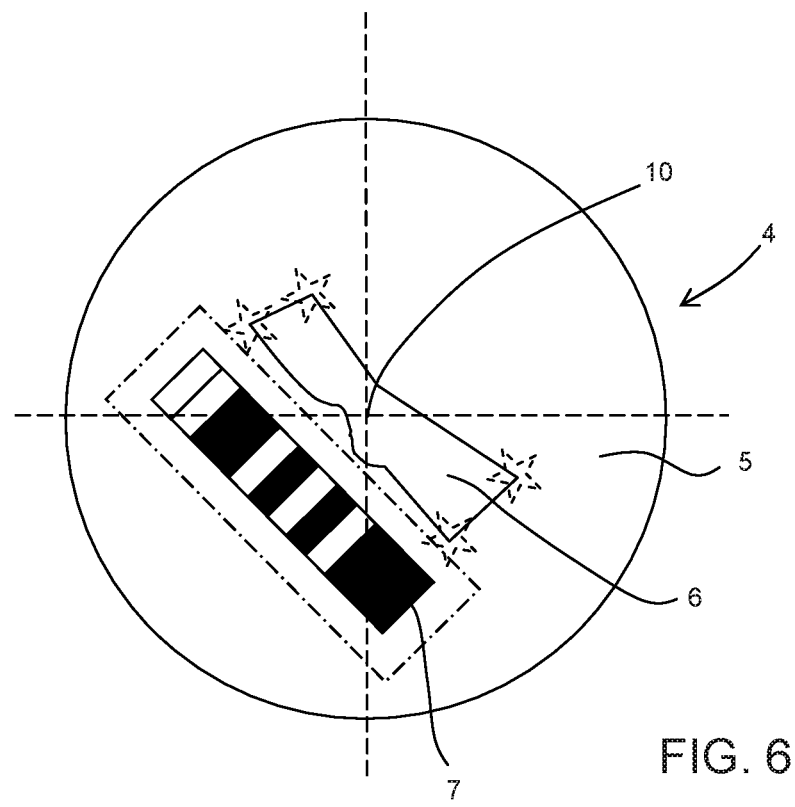
FIG. 6 is a top view with dashed lines of the same elements as in Figure with the capsule rotated by an arbitrary angle.

For example, if a Cartesian reference system is used fixed to the detecting device which is substantially centred on the central point 10 of the surface of the disk-shaped lid 4 (shown with dashed lines in FIGS. 3 and 4 and in FIGS. 5 and 6), the position of the asymmetrical graphical element 6 may be identified by means of an axis coming out of the central point 10 and passing through a characteristic point of it, such as a corner (in FIGS. 3 and 4 the axis is shown with a small dotted line), or by identification of a plurality of its characteristic points, such as any corners (in FIGS. 5 and 6 highlighted by way of example only, with dashed line stars around them). The axis coming out of the central point 10 or the characteristic points uniquely define a second reference system fixed to the asymmetrical graphical element 6. Consequently, once the reference position is known, using the known predetermined position, it is easy to identify the position of an area surrounding the graphical code 7 (such as the dot dash rectangle in the accompanying figures) as well as its reading orientation (that is to say which is the smaller start side 8 in the case of a bar code).

Then, the method comprises, by means of the electronic processing unit of the apparatus 2, reading the graphical code 7 taking into account the position and the orientation which were previously identified in the electronic image. As for identification of the asymmetrical graphical element 6, reading of the graphical code 7, once it is known where and how it is positioned, can be carried out using known image recognition techniques; consequently, that aspect will not be described in further detail herein. By way of example only it should be noticed that if the graphical code 7 is a bar code, the reading step may advantageously comprise examining the graphical code 7 at one or more lines which are parallel to the reading orientation, starting from the smaller start side 8 of the bar code; repeating the same reading along multiple lines may be advantageous for correcting any reading errors due to non-optimum lighting of the lid (for example due to lid surface irregularities).

At the end of the reading step, a code in electronic format is obtained which corresponds to the information contained in the bar code.

For the purposes of this invention, the capsule 1 must be considered recognised when the electronic processing unit has obtained the code in electronic format. In fact at that point, either the code in electronic format can be understood by the apparatus 2 and the beverage can be made as required, or it cannot be understood (for example in the case of a capsule 1 not intended for that type of apparatus 2 and which has been inserted by mistake). In the latter case, depending on the design choices, the apparatus 2 may be programmed either to not continue with supplying with the capsule 1, or to proceed with supplying using "standard" supplying parameters which can be considered safe for any operating condition (that is to say which cannot damage the apparatus even if supplying is performed in the presence of a capsule 1 that is particularly unsuitable for the apparatus).

The method described so far is therefore naturally suited to the context of a method for supplying a beverage using an apparatus 2 that uses capsules 1 which has an image capture zone 21 and a device for acquiring images in electronic format associated with it.

Therefore the recognition method is implemented when the capsule 1 reaches the image capture zone 21. Then, once the capsule 1 has been recognised, come the various possibilities as regards actual supplying.

In a first case it is possible that based on the recognition performed the apparatus 2 sets a plurality of predetermined supplying parameters and automatically supplies the beverage using those predetermined supplying parameters. It should be noticed that, both in this embodiment and in the following embodiments, the predetermined supplying parameters may be completely or partly defined in the electronic code previously acquired or saved in the same apparatus 2.

According to a second way of implementation, based on the recognition performed the apparatus 2 may set a plurality of predetermined supplying parameters, but before proceeding waits for an input indicating that it should proceed from a user via a communication interface. For example, once it is ready to supply, the apparatus 2 may activate a lit push-button or a control on a touch-screen, and the user must press the push-button or control to actually activate the supplying. That push-button may be either a simple start push-button, or may correspond to the beverage related to the type of capsule 1 which has been recognised (e.g. espresso coffee, American coffee, filter coffee, cream coffee, soluble beverage, etc. . . . ). The apparatus 2 then proceeds to supply the beverage using the predetermined supplying parameters only once it has received the input to proceed from the user.

According to a third way of implementation, based on the recognition performed the apparatus 2 may set a plurality of predetermined supplying parameters, but before proceeding it not only waits for an input indicating that it should proceed from a user but also proposes to the user, via the communication interface, the possibility of changing at least one of the supplying parameters. If the user wants to change a parameter obviously this must be done before giving the input to proceed. Once it has received the input to proceed from the user, the apparatus 2 will proceed with supplying the beverage using the supplying parameters as changed if necessary by the user or, in the absence of changes, the predetermined supplying parameters.

In a particular preferred embodiment of the third way of implementation, a predetermined supplying parameter for which the possibility of change can be proposed to the user, is the amount of beverage to be supplied. However, preferably, for every type of beverage it will be possible to make the selection within a predetermined range (it is easy to guess that the range for espresso coffee will be clearly different from that for American coffee—there may even be a ratio of 1:10 between the two).

Furthermore, according to a further particularly preferred embodiment of the third way of implementation described above, if one or more supplying parameters are changed by the user, there may also be an operating step of updating the predetermined supplying parameters which involves substituting those previously saved with those selected by the user. Moreover, depending on requirements, this updating operating step may be carried out either automatically or only after an explicit command given by the user.

Finally it should be noticed that the third way of implementing the method described above may in future be the subject matter of a specific divisional patent application in the context of a method for making a beverage involving electronic recognition of the capsule 1, as described above, but also with reference to methods in which the recognition is achieved in a different way to that which is the subject matter of this patent application (that is to say with or without optical recognition and in any case without recourse to asymmetrical or additional graphical elements 6).

Moreover, thanks to this invention, it has also been possible to provide a method for rendering identifiable each capsule 1 of a plurality of capsules 1 for making beverages for use in an apparatus 2 that uses capsules 1 which is equipped with an optical recognition system.

According to this method, it being understood that each capsule 1 has a cup-shaped body 3 closed at the top by a disk-shaped lid 4 and containing a food substance, there is the operating step of applying to an outer surface 5 of the disk-shaped lid 4 of each capsule 1, both a graphical code 7 and an additional graphical element that is separate from the graphical code 7. Both the graphical code 7 and the additional graphical element must be visible in the visible spectrum. The additional graphical element must also be asymmetrical and must be applied to the disk-shaped lid 4, in a central position of the lid in such a way that it is superposed on a central point 10 of the outer surface 5 of the disk-shaped lid 4.

In turn, the graphical code 7 must be applied to the outer surface 5 of the disk-shaped lid 4 in such a way that it is completely positioned only in one half of the outer surface 5 of the disk-shaped lid 4, and in such a way that it is eccentric relative to the central point 10 and distanced from it.

Furthermore the graphical codes 7 of different capsules 1 may be the same as or different to each other (in the sense that although having the same structure they may contain either the same information of different information—for example, whilst various capsules 1 for making espresso coffee will all be able to have the same graphical code 7, the latter will be different from the graphical code 7 on capsules 1 for American coffee).

In any case, the position of the asymmetrical graphical element 6 and of the graphical code 7 relative to each other will always be a known predetermined position, which will also always be the same at least with respect to the same additional graphical element (in fact it is possible that there may be different additional graphical elements to be used—for example the logos of various manufacturers).

Finally this invention also relates to a capsule 1 for making beverages which is rendered recognisable according to the method just described.

Therefore it is a capsule 1 which comprises a cup-shaped body 3 containing a food substance and a disk-shaped lid 4 which closes the top of the cup-shaped body 3, and wherein, on an outer surface 5 of the disk-shaped lid 4 there is a graphical code 7 bearing coded information suitable for allowing recognition of the capsule 1 by an apparatus 2 for making beverages that is equipped with an optical recognition system.

According to this invention the graphical code 7 is completely positioned in one half of the outer surface 5 of the disk-shaped lid 4, is eccentric relative to a central point 10 of the disk-shaped lid 4 and is distanced from that central point 10.

Moreover, on the outer surface 5 of the disk-shaped lid 4 there is an additional graphical element which is also visible in the visible spectrum, is superposed on said central point 10 and is asymmetrical.

Moreover the position of the asymmetrical graphical element 6 and of the graphical code 7 relative to each other is predetermined, in such a way that the additional graphical element constitutes a reference for identifying a position and a reading orientation of the graphical code 7 relative to the outer surface 5 of the disk-shaped lid 4.

Both the graphical code 7 and the additional graphical element (which may for example be a logo/trademark) will also normally be visible in the visible spectrum.

A final point must be made regarding both the graphical code 7 and the additional graphical element (or asymmetrical graphical element 6) present/applied on the outer surface 5 of the lid. In fact, according to this invention, they may be applied to the lid in any way (for example with an adhesive label); however, in the preferred embodiment, they are printed on the lid before it is applied to the cup-shaped body 3, advantageously directly during production of the sheet of material from which the lid will then have to be cut.

This invention brings important advantages.

In fact thanks to this invention it has been possible to provide a method for recognising a capsule which is able to also recognise capsules marked with a graphical code that is located in an off-centre position (and relatively small), irrespective of the angular position adopted by the capsule lid.

Furthermore, taking that into account, it has been possible to provide both a method for rendering a capsule recognisable, and a capsule made in such a way that it can be recognised with the method according to this invention.

Finally it should be noticed that this invention is relatively easy to produce and that even the cost linked to implementing the invention is not very high.

The invention described above may be modified and adapted in several ways, without thereby departing from the scope of the inventive concept.

All details may be substituted with other technically equivalent elements and the materials used, as well as the shapes and dimensions of the various components, may vary according to requirements.

The invention claimed is:

1. A capsule for making beverages comprising a cup-shaped body (3) that contains a food substance and a disk-shaped lid (4) that closes the top of the cup-shaped body (3), wherein present on an outer surface (5) of the disk-shaped lid (4) there is a graphical code (7) visible in the visible spectrum and bearing coded information suitable for allowing recognition of the capsule (1) by an apparatus (2) for making beverages equipped with an optical recognition system, characterised in that said graphical code (7) is completely positioned in one half of the outer surface (5) of the disk-shaped lid (4), is eccentric relative to a central point (10) of the disk-shaped lid (4) and is at a distance from that central point (10), and in that also present on the outer surface (5) of the disk-shaped lid (4) there is an additional graphical element that is also visible in the visible spectrum, contains said central point (10) and is asymmetrical, wherein the position of the asymmetrical graphical element (6) and of the graphical code (7) relative to each other is predetermined in such a way that the position of the additional graphical element constitutes a reference for identifying a position and a reading orientation of the graphical code (7) relative to the outer surface (5) of the disk-shaped lid (4).

2. A method for rendering identifiable a plurality of capsules for making beverages, to be used in an apparatus (2) that uses capsules (1) and is equipped with an optical recognition system, wherein each capsule (1) has a cup-shaped body (3) closed at the top by a disk-shaped lid (4) and containing a food substance, the method comprising the operating step of applying to an outer surface (5) of the disk-shaped lid (4) of each capsule (1) both a graphical code (7) and an additional graphical element separate from the graphical code (7) which are both visible in the visible spectrum, the additional graphical element being asymmetrical, and wherein the graphical codes (7) of different capsules (1) can be the same or different to each other;

wherein the additional graphical element is applied to the disk-shaped lid (4) in a central position of the disk-shaped lid (4) in such a way that it contains a central point (10) of the outer surface (5) of the disk-shaped lid (4), wherein the graphical code (7) is applied to the outer surface (5) of the disk-shaped lid (4) in such a way that it is completely positioned only in one half of the outer surface (5) of the disk-shaped lid (4), is eccentric relative to the central point (10) and is at a distance from it; and wherein the position of the asymmetrical graphical element (6) and the graphical code (7) relative to each other is a known predetermined position.

3. A method for recognising a capsule in an apparatus that uses capsules for making beverages wherein:
the capsule (1) has a cup-shaped body (3) that is closed at the top by a disk-shaped lid (4) and that contains a food substance;
present on an outer surface (5) of the disk-shaped lid (4) there are an asymmetrical graphical element (6), inside which a central point (10) of the outer surface (5) of the disk-shaped lid (4) lies, and a graphical code (7) that is located in an eccentric position relative to the central point (10); both the asymmetrical graphical element (6) and the graphical code (7) being visible in the visible spectrum;

the position of the asymmetrical graphical element (6) and the graphical code (7) relative to each other is a known predetermined position; and the capsule (1) may adopt, in the apparatus (2), any rotational position relative to its own central axis substantially perpendicular to the disk-shaped lid (4) and passing through the central point (10);

the method comprising the operating steps of:

acquiring, by means of a detecting device (20) of the apparatus (2), an image in electronic format, which shows at least one part of the outer surface (5) of the disk-shaped lid (4) in the visible spectrum, and in which both the asymmetrical graphical element (6) and the graphical code (7) are present;

by means of an electronic processing unit of the apparatus (2), identifying in the electronic image the asymmetrical graphical element (6) or one or more parts of it, identifying its position in the image and saving that position as a reference position; and by means of the electronic processing unit of the apparatus (2), starting from the reference position and using the known predetermined position, identifying in the electronic image both a position in which the graphical code (7) is located and a graphical code (7) reading orientation;

by means of the electronic processing unit of the apparatus (2), reading the graphical code (7) taking into account the position and the orientation previously identified in the electronic image, obtaining a code in electronic format; and considering the capsule (1) recognised when the electronic processing unit has obtained the code in electronic format.

4. The method according claim 3, wherein the graphical code (7) is a bar code and has its own reading orientation, and wherein the step of reading the graphical code (7) comprises examining the graphical code (7) at least at one line parallel to the reading orientation.

5. The method according to claim 4, wherein the step of reading the graphical code (7) comprises examining the graphical code (7) at a plurality of separate lines that are parallel to the reading orientation.

6. A method for supplying a beverage using an apparatus that uses capsules for making beverages and a capsule containing a food substance, wherein:

the capsule (1) has a cup-shaped body (3) closed at the top by a disk-shaped lid (4) and that contains a food substance;

present on an outer surface (5) of the disk-shaped lid (4) there are an asymmetrical graphical element (6) superposed on a central point (10) of the outer surface (5) of the disk-shaped lid (4) and a graphical code (7) located in an eccentric position relative to the central point (10); both the asymmetrical graphical element (6) and the graphical code (7) being visible in the visible spectrum;

the position of the asymmetrical graphical element (6) and the graphical code (7) relative to each other is a known predetermined position; and the capsule (1) may adopt, in the apparatus (2), any rotational position relative to its own central axis substantially perpendicular to the disk-shaped lid (4) and passing through the central point (10);

the method comprising the operating steps of:

with the capsule (1) located at an image capture zone (21) of the apparatus (2), recognising the capsule (1) using the method of recognition according to claim 3;

once the capsule (1) has been recognised, using this information alternatively for:

setting a plurality of predetermined supplying parameters and automatically supplying the beverage using those predetermined supplying parameters; or setting a plurality of predetermined supplying parameters, waiting for a proceed instruction input from a user via a communication interface before proceeding, and supplying the beverage using the predetermined supplying parameters only once the proceed instruction input from the user has been received; or setting a plurality of predetermined supplying parameters; proposing to a user the possibility of modifying at least one of them by means of a communication interface; waiting for a proceed instruction input from the user via the communication interface; once the proceed instruction input from the user has been received, supplying the beverage using the supplying parameters as modified by the user or, in the absence of modifications, the predetermined supplying parameters.

7. The method according claim 6, wherein said at least one predetermined supplying parameter for which the possibility of modification is proposed to the user is the amount of beverage to be supplied.

8. The method according to claim 6, wherein, if the user modifies one or more supplying parameters, there is also the step of updating the predetermined supplying parameters based on the modifications made by the user.

9. The method according to claim 6, wherein the graphical code (7) is a bar code and has its own reading orientation, and wherein the step of reading the graphical code (7) comprises examining the graphical code (7) at least at one line parallel to the reading orientation.

10. The method according to claim 6, wherein the step of reading the graphical code (7) comprises examining the graphical code (7) at a plurality of separate lines that are parallel to the reading orientation.

11. The method according to claim 7, wherein the graphical code (7) is a bar code and has its own reading orientation, and wherein the step of reading the graphical code (7) comprises examining the graphical code (7) at least at one line parallel to the reading orientation.

12. The method according to claim 7, wherein the step of reading the graphical code (7) comprises examining the graphical code (7) at a plurality of separate lines that are parallel to the reading orientation.

13. The method according to claim 8, wherein the graphical code (7) is a bar code and has its own reading orientation, and wherein the step of reading the graphical code (7) comprises examining the graphical code (7) at least at one line parallel to the reading orientation.

14. The method according to claim 8, wherein the step of reading the graphical code (7) comprises examining the graphical code (7) at a plurality of separate lines that are parallel to the reading orientation.

\* \* \* \* \*